E. Meredith
Dry Gas-Meter.
№ 72217  Patented Dec. 17, 1867.
Fig: 1
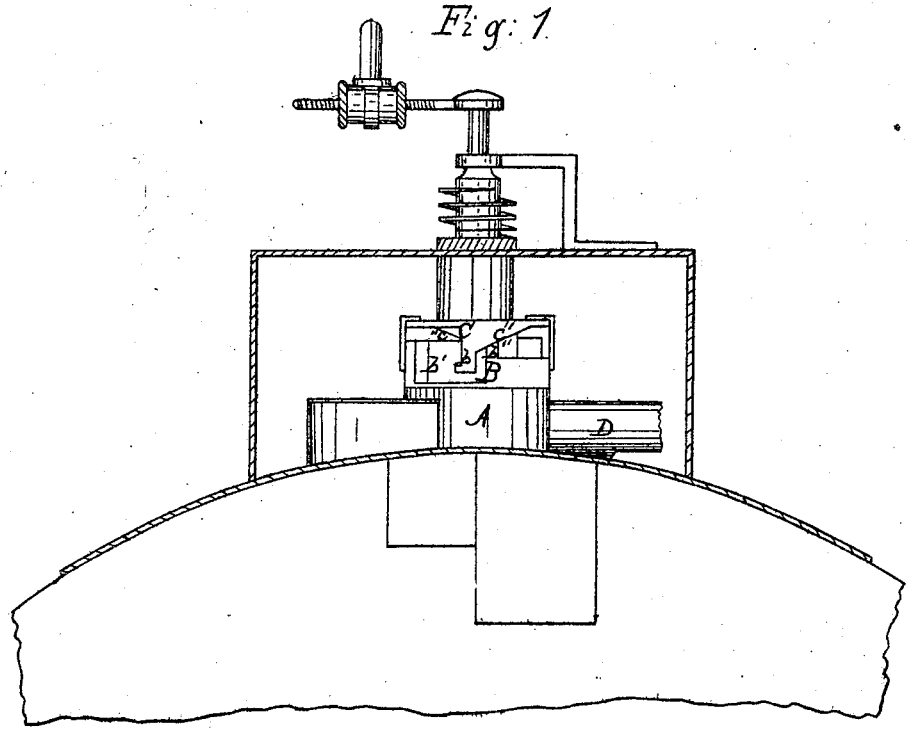
Fig: 2
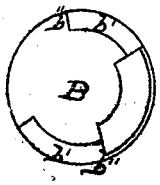
Witnesses
Benj Morrison
James Kinsmore Jr.
Inventor
Edmund Meredith.

United States Patent Office.

EDMUND MEREDITH, OF PHILADELPHIA, PENNSYLVANIA, ASSIGNOR TO HIMSELF AND J. S. SELLERS, OF SAME PLACE.

Letters Patent No. 72,217, dated December 17, 1867.

IMPROVEMENT IN DRY GAS-METERS.

*The Schedule referred to in these Letters Patent and making part of the same.*

TO ALL WHOM IT MAY CONCERN:

Be it known that I, EDMUND MEREDITH, of the city of Philadelphia, in the State of Pennsylvania, have invented a new and useful Improvement in the Dry Gas-Meter; and I do hereby declare that the following is a full, clear, and exact description of the construction and operation of the same, reference being had to the accompanying drawings, making a part of this specification, in which—

Figure 1 is a sectional side elevation of a dry gas-meter, having my improvement applied thereto, and Figure 2 a plane view of the upper or open side of the rotary disk of the valve—

Like letters of reference indicating the same parts when in both figures.

The object of my improvement is to prevent the flow of gas through the meter when the latter is reversed in regard to its connections with the supply and the discharge-pipes, as has frequently been done by the fraudulent consumer for the purpose of avoiding the registration; and my invention consists, substantially as hereinafter described, in so constructing the connections between the rotating disk and its carrier that, when the proper or legitimate direction of the current of gas passing through the meter is reversed, the carrier will override the rotary disk so as to press it down upon its seat, and thus arrest the motion of both, and prevent the disk from being lifted up by the gas, so as to allow the latter to pass out of the meter without being registered.

Referring to the drawings, A is the valve-seat, B the rotary disk of the valve, C the carrier of the disk, and D the legitimate outlet-pipe for the discharge of the gas. The seat A and the rotary disk B have their adjoining or contact faces made and adjusted together in the usual manner; but the periphery and the upper side of the disk B have two recesses, $b'\ b'$, each recess being made for the reception and free motion therein of an arm, $c'$, which extends down at opposite sides of the carrier C. These arms $c'$ have each an inclined plane, $c''$, which extends upward from near the lower end of the arm to the under side of the flat disk of the carrier, from which the arms project, while the opposite side of the arm is nearly vertical, and bears against the forward boundary of the recess $b'$ when the carrier is in motion in its legitimate direction, and thus causes the disk B to rotate on its seat A in transmiting the gas through the meter to the outlet-pipe D; but should the meter be reversed, so as to reverse therein the direction of the current of gas, or, in other words, to make the outlet-pipe D serve as the inlet, the first movement of the bellows will cause the carrier C to rotate in a contrary direction, and bring each of its inclined planes $c''$ into contact with the rear boundary $b''$ of its respective recess $b'$ in the disk B, so that it will slide up thereon (see fig. 1) sufficiently to press the said disk closely down upon its seat A, and, consequently, stop the flow of gas through the meter, and thus prevent the fraudulent consumption before specified.

Having thus fully described my improvement in the dry gas-meter, what I claim as my invention, and desire to secure by Letters Patent, is confined to the following:

I claim the application of the inclined planes $c''$, either to the carrier C or to the rotary disk B, so as to operate substantially as and for the purpose described.

EDMUND MEREDITH.

Witnesses:
  BENJ. MORISON,
  JAMES WINSMORE, Jr.